United States Patent [19]
Bender et al.

[11] Patent Number: 6,006,015
[45] Date of Patent: Dec. 21, 1999

[54] SYSTEM AND METHOD OF PRINTER IMAGE WARPING

[75] Inventors: Michael Donald Bender; Allen Patrick Johnson, both of Lexington, Ky.; Gregory John Sherwood, Littleton, Colo.; Aaron Charles Yoder, Lexington, Ky.

[73] Assignee: Lexmark International, Inc., Lexington, Ky.

[21] Appl. No.: 08/992,858

[22] Filed: Dec. 18, 1997

[51] Int. Cl.[6] .................................................. G06F 15/00
[52] U.S. Cl. ..................... 395/117; 395/109; 399/301; 382/215; 382/287; 382/294
[58] Field of Search ................................... 395/101, 102, 395/104, 105, 109, 111, 117; 399/39, 40, 72, 294–301; 382/215, 254–258, 162, 288, 287, 293, 299, 302; 358/526, 540; 347/19, 116; 101/485

[56] References Cited

U.S. PATENT DOCUMENTS

| | | | |
|---|---|---|---|
| 4,543,590 | 9/1985 | Tazaki et al. | 346/140 R |
| 4,622,545 | 11/1986 | Atkinson | 340/747 |
| 4,721,969 | 1/1988 | Asano | 347/116 |
| 5,040,003 | 8/1991 | Willis | 346/157 |
| 5,140,674 | 8/1992 | Anderson et al. | 395/111 |
| 5,251,271 | 10/1993 | Fling | 382/162 |
| 5,321,467 | 6/1994 | Tanaka et al. | 355/202 |
| 5,388,517 | 2/1995 | Levien | 101/485 |
| 5,402,726 | 4/1995 | Levien | 101/481 |
| 5,424,763 | 6/1995 | Komiya et al. | 347/116 |
| 5,491,568 | 2/1996 | Wan | 358/518 |
| 5,587,771 | 12/1996 | Mori et al. | 355/208 |
| 5,592,262 | 1/1997 | Tanaka et al. | 399/1 |
| 5,760,914 | 6/1998 | Gauthier et al. | 358/298 |
| 5,887,125 | 3/1999 | Takano et al. | 395/111 |

*Primary Examiner*—Edward L. Coles
*Assistant Examiner*—Sterling W. Chandler
*Attorney, Agent, or Firm*—Ronald K. Aust

[57] ABSTRACT

Method and apparatus facilitate alignment of a print image to a desired position. The print image includes a set of original linear groupings of pixels. A distortion of the print image is determined as compared to the desired position. Based on the determined distortion, a set of original linear groupings of pixels to warp is identified. A set of warped linear groupings of pixels is then generated, which correspond to the set of original groupings of pixels. A placement location in the print image for the warped linear groupings of pixels so generated is identified, and the print image is printed with the set of warped linear groupings of pixels.

18 Claims, 4 Drawing Sheets

SYSTEM AND METHOD OF PRINTER IMAGE WARPING

BACKGROUND OF THE INVENTION

1. Field of the Invention

The present invention relates to hybrid printers that put two images on a single page, more specifically, this invention solves the print quality problem that results from misregistration of portions of the second print image on the first print image.

2. Description of the Prior Art

Hybrid printers print two images on a single page. A common type of hybrid printer combines laser and color ink-jet printing on a single page. In this type of printer, the laser print engine will print the black image on the page and then feed the paper into a color printer, such as an ink-jet, where the color (CMY) part of the image will be printed. The largest print quality issue that results from this process is the lack of uniform registration between the black and color portions of the image. Whenever the black plane of an image is stretched or compressed in the horizontal or vertical direction, the color planes that are subsequently printed will appear misregistered.

Distortion in the black plane image is inherent in some print processes and may not vary between printers of the same model. The distortion measured for such printers will stay the same throughout the life of the printer. Many factors cause black plane distortion in the laser printing process such as heat, variations of speed of the paper, humidity, and optical characteristics of the laser system Distortion may be in both the horizontal and vertical directions, may be linear or non-linear, and could be in both processes. If the distortion is identified and measured it becomes predictable and may be masked or camouflaged.

The human eye cannot detect the distortions that exist in the laser process when only the black and white image is printed. However when another undistorted or differently distorted image, such as a color image, is printed on top of the black and white image, distortions of the black plane image become apparent. Thus, it is therefore not cost effective to correct the distortions of the laser printer in hardware. This invention addresses the need for masking or camouflaging distortions of the black plane image without hardware.

SUMMARY OF THE INVENTION

The present invention is directed to apparatus and method for aligning a print image to be printed by a printer to a desired position.

One method of the invention includes the steps of: determining a distortion of the print image compared to the desired position; based on the determined distortion, identifying a set of original linear groupings of pixels to warp; generating a set of warped linear groupings of pixels corresponding to the set of original linear groupings of pixels; identifying a placement location in the print image for the warped linear groupings of pixels generated; and printing the print image with the set of warped linear groupings of pixels.

Another method of the invention is directed to aligning a second print image, having a plurality of linear groupings of pixels, with a first print image, having a corresponding plurality of linear groupings of pixels, wherein a first printer produces the first print image and a second printer produces the second print image. This method includes the steps of: determining a distortion of the first print image; based on the determined distortion, identifying a set of linear groupings of pixels from the second print image to warp; generating a warped linear grouping of pixels for each linear grouping of pixels of the set of linear groupings of pixels; identifying a placement location in the second print image for each warped linear grouping of pixels generated; and printing the second print image with each warped linear grouping of pixels being in alignment with each corresponding linear grouping of pixels of the first print image.

A preferred image forming apparatus of the invention includes a first printer for printing a first print image on a page; a second printer for printing a second print image on a page; and an image processor for masking a distortion of the first print image. The image processor includes means for determining a distortion of the first print image; means for identifying a set of original linear groupings of pixels of the second print image to warp based on the distortion of the first print image; means for generating a warped linear grouping of pixels which corresponds to each original linear grouping of pixels of the set of original linear groupings of pixels; means for identifying a placement location for each warped linear grouping of pixels generated; and means for placing each warped linear grouping of pixels at its respective location.

Other features and advantages of the invention may be determined from the drawings and detailed description of the invention that follows.

DETAILED DESCRIPTION OF THE INVENTION

Figure 1:
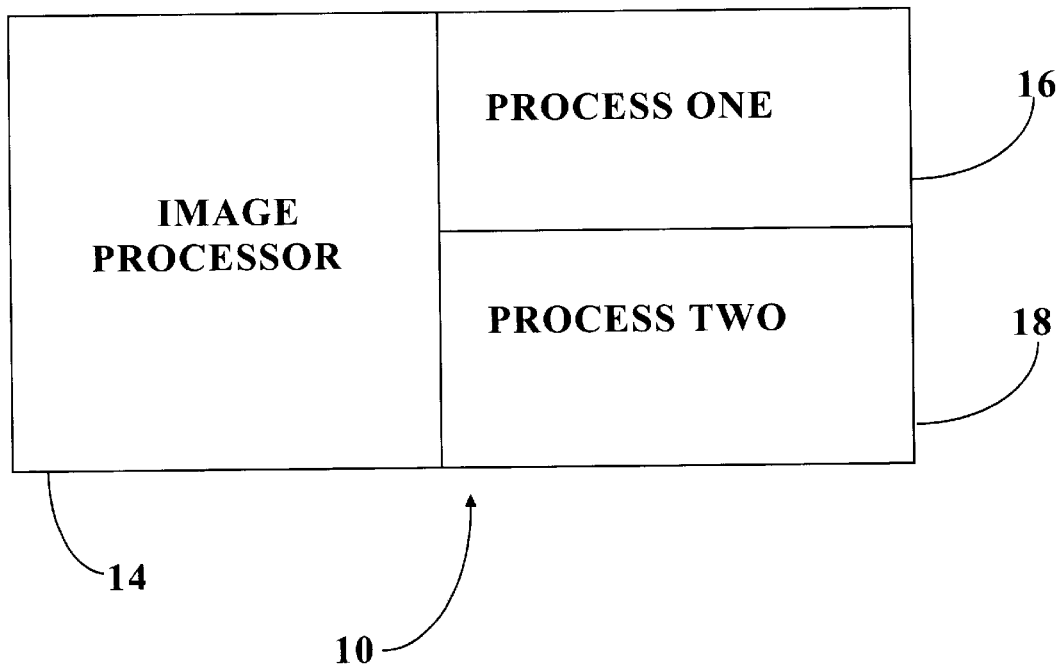
FIG. 1 is a block diagram of the system that is adapted to carry out the invention.

The present invention provides a system and a method for warping a print image to emulate the distortions of the other print image. This allows the print images to appear properly aligned.

This invention further provides a system and method of aligning any two print processes that do not line up pel for pel. To make it easier to explain, however, this application refers to the first print process as a laser print process and the second print process as an ink jet process. In addition, the invention is also described for warping the second print process to emulate the distortion of the first print process. Note that any of the two print processes may be warped to emulate any distortion measured.

A laser printer may be used to create a test black plane image on a piece of paper. The black plane image may be scanned to measure the placement of dots on the page or the measurements may be made manually. The distortion or the degree at which the dots have been incorrectly placed across the printed page is measured. From the measured distortion, an error table is created that represents the linearities or non-linearities inherent in the print process.

Error tables are created to quantify the distortions in the horizontal and/or vertical directions of any black plane image. These error tables are then used to similarly warp the color planes (CMY) of the color image before the image is sent to the color imaging device.

Warping of the color image occurs through the creation of composite linear groupings of pixels, or pels. Such linear groupings may be in the form of a single row of pels (e.g., a scan line) or a vertical column of pels (e.g., a slice). A pel is a common abbreviation for picture element. These are the individual dots on a page that are used to create an image. For example, if printing an image that is 600 dots per inch, a pel is a dot in the image that is 1/600 of an inch across. A typical printed image is formed by one or more rectangular region(s) of pels. In a general printing system, this image is represented in the printer's memory such that each pel is represented by one bit of memory. Each pel, therefore, has two states: on and off.

There are two situations that arise that force the creation of a composite linear grouping of pixels. First, for example, the error table could indicate that a new slice must be added between slice n and slice n+1. The new slice will be a composite of slices one position apart, such as slice n and slice n+1. Second, for example, the error table could indicate that slice n must be removed. Instead of completely removing slice n which may cause an artifact, a new slice is created to replace slice n and n+1. The replacement slice is a composite of slice n and n+1.

Composite linear groupings of pixels (albeit slices or scan lines) n and n+1 may be generated by performing a logical OR or a logical AND of linear grouping of pixels n and linear grouping of pixels n+1. Logical OR or logical AND retains image information from the two lines to be combined. However, with most color dithering techniques, this may produce undesirable visual artifacts that show up as light or dark streaks through what should be uniform color on the page.

Performance of the invention can be enhanced through a process known as "noise ordered dithering". Noise ordered dithering techniques are used when the images are originally created in the printer's image processor so that when composite linear groupings of pixels are formed, artifacts will be minimized. Dithering is a method of creating colors by arranging groups of pels. Ordered techniques are generally very geometric and uniform and therefore any breaks in the patterns (as a result of composite linear groupings of pixels for example) are very noticeable. When using "noise ordered" dithering, there are no uniform geometric patterns in the color generation to start with, and therefore, the composite linear groupings of pixels do not become as visible to the human eye. Once the color plane image is warped through the use of composite linear groupings of pixels, it is then sent to the engine of the color imaging device.

A preferred embodiment of the invention is described in detail below. Referring to the drawings, like numbers indicate like components and/or steps throughout the views.

Table Creation of Measured Distortion

In FIG. 1, printer system 10 includes an image processor 14 and two printer processes labeled Process One 16 and Process Two 18. The image processor takes data from a user application and encodes it into binary images that are sent to the print processes 16 and 18. An image processor may be Lexmark's Raster Image Processor (RIP Controller). Process One 16 and Process Two 18 may be any type of print engines such as a laser print engine and an ink-jet print engine. In the present embodiment, the paper paths for Process One 16 and Process Two 18 may be joined. That is, once Process One 16 prints the image on the page, the same page is fed to Process Two 18. If the paper paths of the two print processes 16 and 18 are not joined, a user may manually feed the paper into one printer and then feed the same paper to the other printer.

The embodiment described below is directed to slice oriented image data. Those skilled in the art, however, will recognize that the invention also is applicable to scan line oriented image data. In the present embodiment, an arbitrary sampling distance along a horizontal dimension of an image, for example a sampling distance of 0.25 inches, may be used. To measure horizontal distortion, vertical slices are printed using Process One 16 spaced at the selected sampling distance. Each vertical slice is printed at a single pel thickness, and the slices are expected to be printed exactly 0.25 inch apart. Once the vertical slice pattern is printed, the distance between adjacent printed vertical slices is measured. An optical scanning device may be used to measure the distance between adjacent printed vertical slices. The difference between the expected position of each slice, and the actual measured position is then placed in a table as shown in Table 1, entitled: Sample Table of Measured Distortion in the Horizontal Dimension. Table 1 is for a print process printing an image at 600 dots per inch. Note, if it is desired to measure vertical distortion, horizontal lines are printed and the same type of measurement is taken, and the measured position is placed in a sample table representative of measured distortion in the vertical dimension. For each printer process 16 or 18, there may be created a horizontal error table and/or a vertical error table.

TABLE 1

Sample Table of Measured Distortion in the Horizontal Dimension

| Horizontal Position (inches) | Horizontal Error (600 dpi pels) |
|---|---|
| 0.25 | 0 |
| 0.5 | −4.15 |
| 0.75 | −4.92 |
| 1.0 | −4.99 |
| 1.25 | −4.47 |
| 1.5 | −3.85 |
| 1.75 | −3.19 |
| 2.0 | −2.64 |
| 2.25 | −2.33 |
| 2.5 | −2.10 |
| 2.75 | −2.11 |
| 3.0 | −2.25 |
| 3.25 | −2.58 |
| 3.5 | −3.09 |
| 3.75 | −3.88 |
| 4.0 | −4.81 |
| 4.25 | −5.81 |
| 4.5 | −6.76 |
| 4.75 | −7.43 |
| 5.0 | −7.92 |
| 5.25 | −8.15 |
| 5.5 | −8.15 |
| 5.75 | −7.90 |
| 6.0 | −7.51 |
| 6.25 | −6.84 |
| 6.5 | −5.90 |
| 6.75 | −4.71 |
| 7.0 | −3.40 |
| 7.25 | −2.01 |
| 7.5 | −0.88 |
| 7.75 | −0.06 |
| 8.0 | −0.28 |

In Table 1, above, the first column represents the distance from the left edge of the paper where each vertical slice should be printed and also where the vertical slice is represented in the printer's internal representation of the page before it is sent to the actual printer engine. For example, a vertical slice that should be printed 0.5 inches from the left edge of the paper is actually printed 4.15 pels to the left of the 0.5 position. Since the error is in pels, the vertical slice that is actually printed is located 0.5 inch–4.15/600 inches or about 0.49308 inches from the left side of the paper. The error is represented in pels because that is the discrete representation of the image that can be controlled by the printer.

To create the error table, such as Table 2 entitled: Sample Error Table, the error measurements from each vertical slice is entered into a table where the first column contains the pel location of the image, the second column contains the measured errors (as described in Table 1) and the third column contains the rounded linear interpolation of the error. For ease of understanding the generation of the error table depicted in Table 2, printing is assumed to be at 40 dots per inch (dpi). An example of an error table follows:

TABLE 2

Sample Error Table

| Horizontal Pel Location In Image | Measured errors from Table 1 | Rounded linear interpolation for errors measurement at each pel. |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 ¼ inch | 0 | 0 |
| 10 | 0 | 0 (−0.415) |
| 11 | 0 | −1 (−0.83) |
| 12 | 0 | −1 (−1.245) |
| 13 | 0 | −2 (−1.66) |
| 14 | 0 | −2 (−2.075) |
| 15 | 0 | −2 (−2.49) |
| 16 | 0 | −3 (−2.905) |
| 17 | 0 | −3 (−3.32) |
| 18 | 0 | −4 (−3.735) |
| 19 ½ inch | −4.15 | −4 |
| 20 | 0 | −4 |
| 21 | 0 | −4 |
| 22 | 0 | −4 |
| 23 | 0 | −4 |
| 24 | 0 | −5 |
| 25 | 0 | −5 |
| 26 | 0 | −5 |
| 27 | 0 | −5 |
| 28 | 0 | −5 |
| 29 ¾ inch | −4.92 | −5 |
| 30 | 0 | −5 |
| 31 | 0 | −5 |
| 32 | 0 | −5 |

TABLE 2-continued

Sample Error Table

| Horizontal Pel Location In Image | Measured errors from Table 1 | Rounded linear interpolation for errors measurement at each pel. |
|---|---|---|
| 33 | 0 | −5 |
| 34 | 0 | −5 |
| 35 | 0 | −5 |
| 36 | 0 | −5 |
| 37 | 0 | −5 |
| 38 | 0 | −5 |
| 39 1 inch | −4.99 | −5 |

As set forth in Table 2, the 40 dpi horizontally adjacent pels on the page are numbered from 0 to 39 in the first column of Table 2. The error number in pels in the second column come from the measured errors from Table 1, column 2. Column 3 of Table 2 contains the linear interpolation of the error across each measurement range and then this value is rounded. For example, referring to Table 2, third column, the error from the ninth pel at 0.25 inch is 0 and the error at the 19th pel at 0.5 inch is −4.15. The error of 4.15 is then spread out from pel 9 to pel 19 in increments of 0.415. Table 2 shows in parenthesis the actual error and to the left of the parenthesis the rounded value.

In the preferred embodiment, the error table is created dynamically as the data is needed. In other embodiments, the error table may be created once and kept in memory for access as needed.

From the error table entries such as shown in Table 2, composite slices of the color image are created. There are essentially three possible situations that may arise: (1) no composite slice is required and the data for that slice is copied as it is; (2) a new slice must be added between slices n and n+1; and (3) slice n must be removed. A detailed description of each of these possible situations is described below.

Warping of the Color Image

Table 3, entitled: Image Warping Example Showing the Elimination of Slices, includes the horizontal pel location and error entry of Table 2 in columns 1 and 2, the original data in column 3, the warped (distorted) image data is entered in column 4, and a comment for ease of understanding in column 5. The Original Slice Image Data is any part of an image, text or white space to be printed. In the example, unique data is placed in each Original Slice Image Data so that it is easier to see where the data ends up in the Warped Slice Image Data. Note, when a pel location contains a "1", toner or ink will be placed on the page in the corresponding location. If the pel location contains a "0", no toner or ink is placed on the page.

TABLE 3

Image Warping Example Showing the Elimination of Slices

| Horizontal Pel Location | Error Table Entry | Original Slice Image Data | | Warped Slice Image Data | | Warped Data Comment |
|---|---|---|---|---|---|---|
| | | Byte 0 | Byte 1 | Byte 0 | Byte 1 | |
| 0 | 0 | 00000000 | 00000000 | 00000000 | 00000000 | Original Data 0 |
| 1 | 0 | 00000000 | 00000001 | 00000000 | 00000001 | Original Data 1 |

TABLE 3-continued

Image Warping Example Showing the Elimination of Slices

| Horizontal Pel Location | Error Table Entry | Original Slice Image Data | | Warped Slice Image Data | | Warped Data Comment |
|---|---|---|---|---|---|---|
| | | Byte 0 | Byte 1 | Byte 0 | Byte 1 | |
| 2 | 0 | 00000000 | 00000010 | 00000000 | 00000010 | Original Data 2 |
| 3 | 0 | 00000000 | 00000011 | 00000000 | 00000011 | Original Data 3 |
| 4 | 0 | 00000000 | 00000100 | 00000000 | 00000100 | Original Data 4 |
| 5 | 0 | 00000000 | 00000101 | 00000000 | 00000101 | Original Data 5 |
| 6 | 0 | 00000000 | 00000110 | 00000000 | 00000110 | Original Data 6 |
| 7 | 0 | 00000000 | 00000111 | 00000000 | 00000111 | Original Data 7 |
| 8 | 0 | 00000000 | 00001000 | 00000000 | 00001000 | Original Data 8 |
| 9 | 0 | 00000000 | 00001001 | 00000000 | 00001001 | Original Data 9 |
| 10 | 0 | 00000000 | 00000000 | 01010101 | 10101010 | Composite 10 & 11 |
| 11 | −1 | 11111111 | 11111111 | 01010101 | 10101010 | Composite 12 & 13 |
| 12 | −1 | 00000000 | 00000000 | 00000000 | 00001110 | Original Data 14 |
| 13 | −2 | 11111111 | 11111111 | 01010101 | 10101010 | Composite 15 & 16 |
| 14 | −2 | 00000000 | 00001110 | 01010101 | 10101010 | Composite 17 & 18 |
| 15 | −2 | 00000000 | 00000000 | 00000000 | 00010011 | Original Data 19 |
| 16 | −3 | 11111111 | 11111111 | 00000000 | 00010100 | Original Data 20 |
| 17 | −3 | 00000000 | 00000000 | 00000000 | 00010101 | Original Data 21 |
| 18 | −4 | 11111111 | 11111111 | 00000000 | 00010110 | Original Data 22 |
| 19 | −4 | 00000000 | 00010011 | 01010101 | 10101010 | Composite 23 & 24 |
| 20 | −4 | 00000000 | 00010100 | 00000000 | 00011001 | Original Data 25 |
| 21 | −4 | 00000000 | 00010101 | 00000000 | 00011010 | Original Data 26 |
| 22 | −4 | 00000000 | 00010110 | 00000000 | 00011011 | Original Data 27 |
| 23 | −4 | 00000000 | 00000000 | 00000000 | 00011100 | Original Data 28 |
| 24 | −5 | 11111111 | 11111111 | 00000000 | 00011101 | Original Data 29 |
| 25 | −5 | 00000000 | 00011001 | 00000000 | 00011110 | Original Data 30 |
| 26 | −5 | 00000000 | 00011010 | 00000000 | 00011111 | Original Data 31 |
| 27 | −5 | 00000000 | 00011011 | 00000000 | 00100000 | Original Data 32 |
| 28 | −5 | 00000000 | 00011100 | 00000000 | 00100001 | Original Data 33 |
| 29 | −5 | 00000000 | 00011101 | 00000000 | 00100010 | Original Data 34 |
| 30 | −5 | 00000000 | 00011110 | 00000000 | 00100011 | Original Data 35 |
| 31 | −5 | 00000000 | 00011111 | 00000000 | 00100100 | Original Data 36 |
| 32 | −5 | 00000000 | 00100000 | 00000000 | 00100101 | Original Data 37 |
| 33 | −5 | 00000000 | 00100001 | 00000000 | 00100110 | Original Data 38 |
| 34 | −5 | 00000000 | 00100010 | 00000000 | 00100111 | Original Data 39 |
| 35 | −5 | 00000000 | 00100011 | | | |
| 36 | −5 | 00000000 | 00100100 | | | |
| 37 | −5 | 00000000 | 00100101 | | | |
| 38 | −5 | 00000000 | 00100110 | | | |
| 39 | −5 | 00000000 | 00100111 | | | |

Given the error table entries of Table 3 and the Original Slice Image Data of Table 3, the color printing process is altered in the following manner. A new left boundary and a new right boundary is calculated. In the example, the old left boundary is 0 and the old right boundary is 39 since printing is at 40 dots per inch. The calculation would be as follows:

new_left=old_left+errortable[old_left]=0+0 =0
new_right=old_right+errortable[old_right]=39−5=34

Since new_right is 34, the image processor must print 40 slices in a data space of 35. This implies that a few composite slices must be created.

Data from the Original Slice Image Data buffer is warped into the Warped Slice Image Data buffer. Three counters are utilized. The counter orig_position keeps track of the position in the Original Slice Image Data buffer. The counter next_warped_pos is the location of where the next slice should be placed in the Warped Image Data buffer. The counter last_warped_pos is the location of where the last slice was placed in the Warped Slice Image Data buffer.

Next, the first slice of Original Slice Image Data is copied into the Warped Slice Image Data buffer and last_warped_pos is initialized to new_left which is zero (0). Now for each horizontal orig_position from old_left+1 through old_right, the following equation tells us how the image data from Original Slice Image Data buffer should be moved to the Warped Slice Image Data buffer.

| Step | Pseudo-code |
|---|---|
| [210] | next_warped_pos = orig_position + error[orig_position] |

The counter next_warped_pos is now compared to last_warped_pos to determine if a composite slice must be created or if the data from the Original Slice Image Data buffer should be moved to the Warped Slice Image Data buffer untouched. There are three possibilities: (1) the data may be copied directly; (2) a slice needs to be removed; and (3) a slice needs to be added.

The process of the invention will now be described with reference to FIGS. 2–4. Note, Original_Buffer refers to the data in the Original Slice Image Data buffer and Warped_Buffer refers to data in the Warped Slice Image Data buffer.

A. No Creation of a Slice

Figure 2:
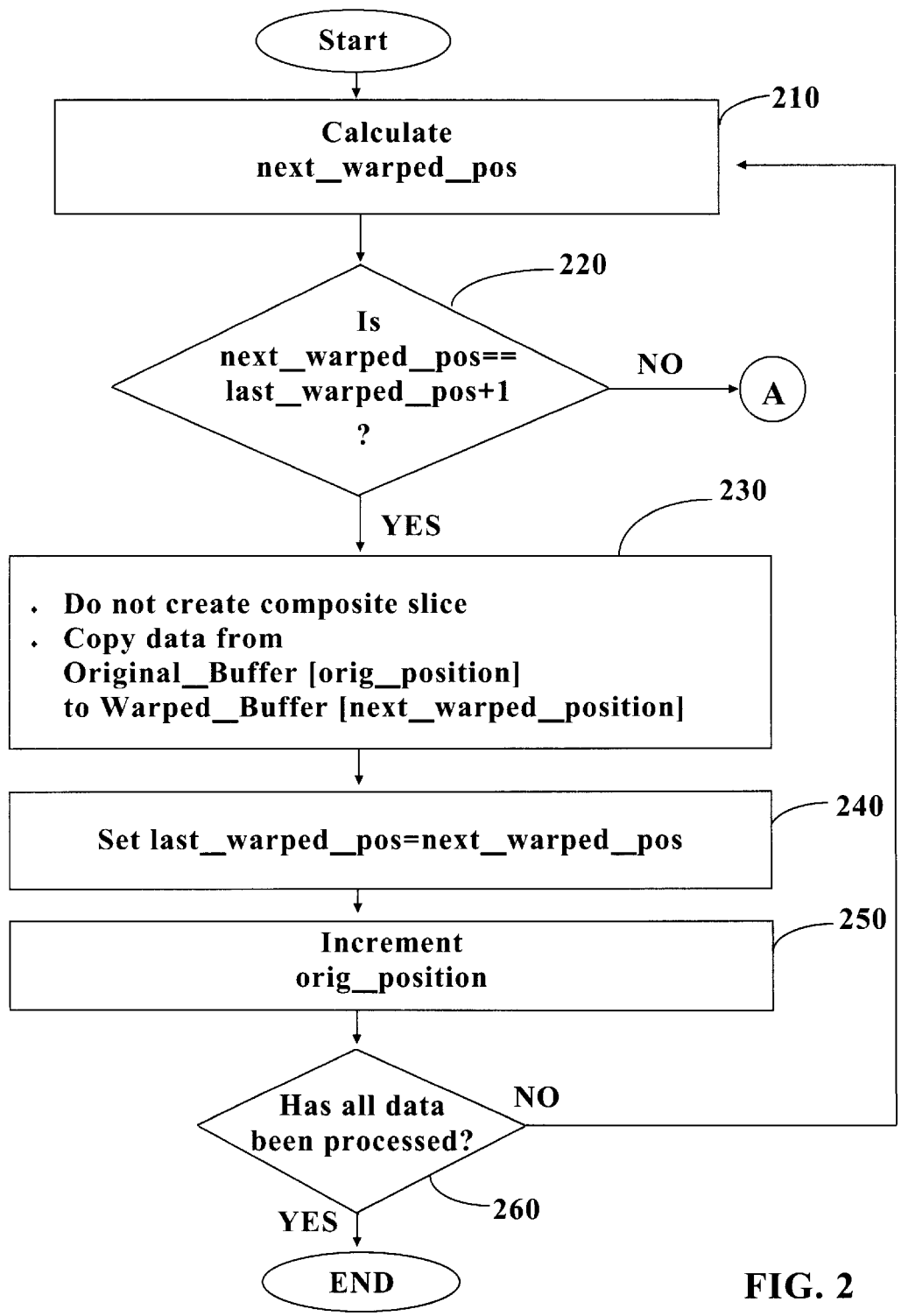
FIG. 2 is a flowchart generally depicting the algorithm when no linear grouping of pixels (e.g., a slice) is added or removed.

Referring to FIG. 2, the counter next_warped_pos is calculated to be orig_position+error[orig_position] at step 210. In step 220, if next_warped_pos is one more than last_warped_pos a composite slice need not be created. In this instance at step 230, the data from the Original Slice Image Data buffer is copied to the Warped Slice Image Data buffer, at step 240 last_warped_pos is set to next_warped_pos, and at step 250, orig_position is incremented. At step 260, it is determined whether all data has been processed. If all data has not been processed, then the algorithm continues at step 210. If all data has been processed, however, the process is complete.

| Step   | Pseudo-code                                                                                      |
| ------ | ------------------------------------------------------------------------------------------------ |
| [210]  | next_warped_pos = orig_position + error[orig_position];                                          |
| [220]  | if next_warped_pos == last_warped_pos + 1                                                        |
| [230]  | copy data from Original_Buffer[orig_position] to Warped_Buffer [next_warped_position];           |
| [240]  | last_warped_pos = next_warped_pos;                                                               |
| [250]  | orig_position++;                                                                                 |

The following are sample iterations using the error table shown in Table 3.

Iteration 1 orig_position is 1;
last_warped_pos is 0;
next_warped_pos = 1 + error[1]; /* next_warped_pos is 1 */
Since next_warped_pos == last_warped_pos + 1 no composite slice;
Data from Original_Buffer[1] is copied to Warped_Buffer[1];
last_warped_pos = next_warped_pos; /* last_warped_pos gets 1 */
orig_position is incremented to 2.

Iteration 2 orig_position is 2;
last_warped_pos is 1;
next_warped_pos = 2 + error[2]; /* next_warped_pos is 2 */
Since next_warped_pos == last_warped_pos + 1 no composite slice;
Data from Original_Buffer[2] is copied to Warped_Buffer[2];
last_warped_pos = next_warped_pos; /* last_warped_pos gets 2 */
orig_position is incremented to 3.
. . .
. . .

Iteration 10 orig_position is 10;
last_warped_pos is 9;
next_warped_pos = 10 + error[10]; /* next_warped_pos is 10 */
Since next_warped_pos == last_warped_pos + 1 no composite slice;
Data from Original_Buffer[10] is copied to Warped_Buffer[10];
last_warped_pos = next_warped_pos; /* last_warped_pos gets 10 */
orig_position is incremented to 11.

B. Removal of a Slice

Figure 3:
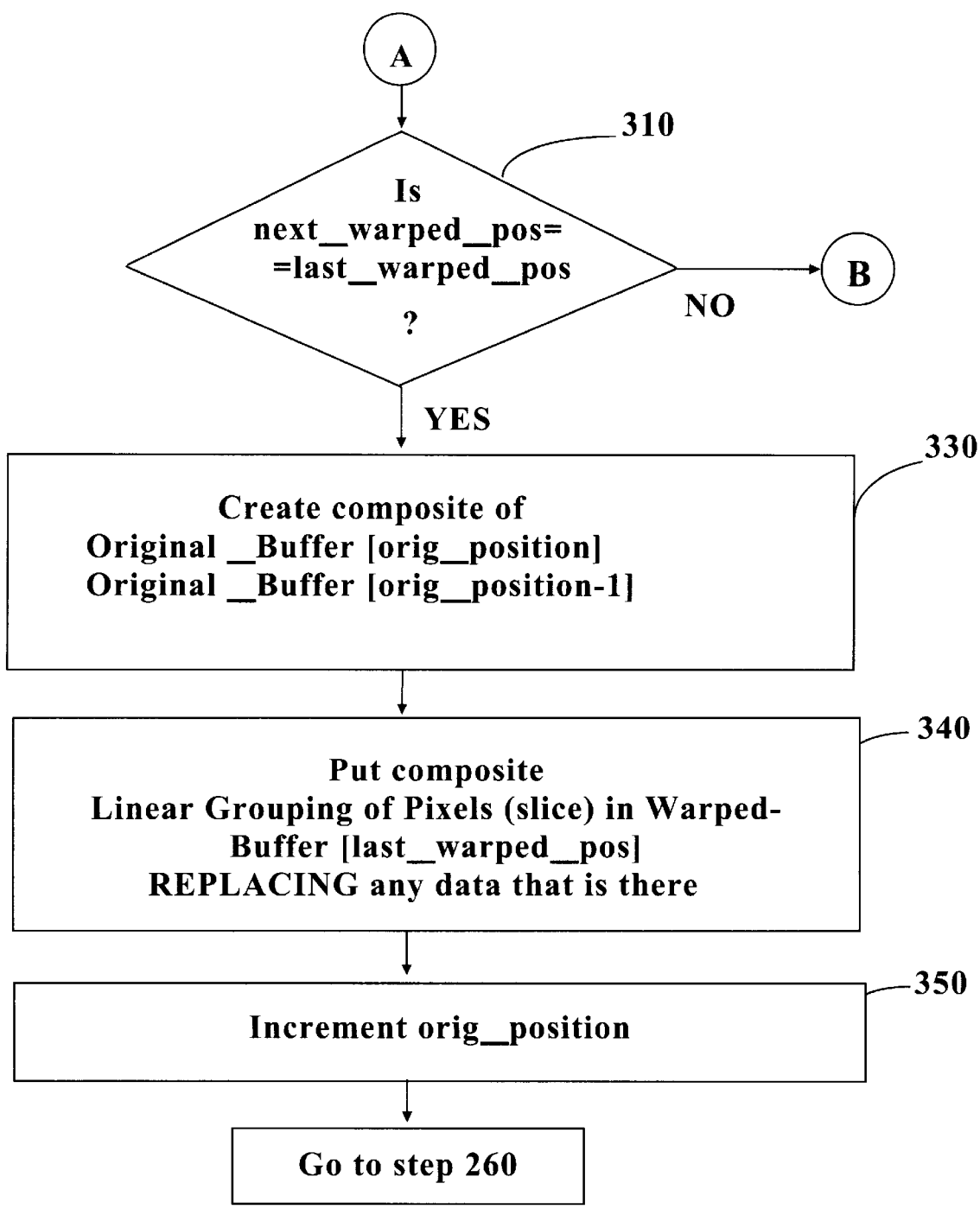
FIG. 3 is a flowchart generally depicting the algorithm for removing a linear grouping of pixels (e.g., a slice).

If the result of step 220 is "No", then the process continues as depicted in FIG. 3, at step 310. If next_warped_pos is the same as last_warped_pos at step 310, there are two vertical slices in the Original Slice Image Data buffer that must occupy the same location in the Warped Slice Image Data buffer. In this instance, a composite slice is created at step 330. The composite slice is placed in Warped_Buffer[last_warped_pos] at step 340 and orig_position is incremented at step 350. Thereafter, the process continues at 260 of FIG. 2.

| Step   | Pseudo-code                                                                                              |
| ------ | -------------------------------------------------------------------------------------------------------- |
| [310]  | if next_warped_pos == last_warped_pos                                                                    |
| [330]  | create composite of Original_Buffer[orig_position] and Original_Buffer [orig_position − 1];              |
| [340]  | put composite slice in Warped_Buffer[last_warped_pos] REPLACING any data that is there;                  |
| [350]  | orig_position++;                                                                                         |

A composite slice is created as follows:

```
// Define some memory buffers to represent the vertical slices of data
in question
    char SliceA[vertical slice size];
    char SliceB[vertical slice size];
    char Composite[vertical slice size];
    // For every byte in the vertical slices of data, sample the two slices
from a composite byte
    // alternating the sampling methodology on even and odd bytes to
introduce "randomness"
    for every byte in the slice (0 to vertical slice size − 1)
        if (byte is at odd address)
            Composite[byte] = (SliceA[byte] LOGICAL_AND 0xAA)
                                    LOGICAL_OR
                              (SliceB[byte] LOGICAL_AND 0x55)
        else
            Composite[byte] = (SliceA[byte] LOGICAL_AND 0x55)
                                    LOGICAL_OR
                              (SliceB[byte] LOGICAL_AND 0xAA)
```

The following are sample iterations using the error table shown in Table 3. In this example, a composite slice does not have to be created until orig_position is equal to 11. Note that in iteration 12 Warped_Buffer[11] gets data from Original_Buffer[12], and in iteration 13 the data in Warped_Buffer[11] is overwritten by the composite slice of Original_Buffer[13] and Original_Buffer[12].

Iteration 11 orig_position is 11;
last_warped_pos is 10;
next_warped_pos = 11 + error[11]; /* next_warped_pos is 10 */
Since next_warped_pos == last_warped_pos create a composite slice;
Create composite of Original_Buffer[11] and Original_Buffer[10];
Put composite slice in Warped_Buffer[10]
orig_position is incremented to 12.

Iteration 12 orig_position is 12;
last_warped_pos is 10;
next_warped_pos = 12 + error[12]; /* next_warped_pos is 11 */
Since next_warped_pos == last_warped_pos + 1 no composite slice;
Data from Original_Buffer[12] is copied to Warped_Buffer[11];
last_warped_pos = next_warped_pos; /* last_warped_pos gets 11 */
orig_position is incremented to 13.

Iteration 13 orig_position is 13;
last_warped_pos is 11;
next_warped_pos = 13 + error[13]; /* next_warped_pos is 11 */
Since next_warped_pos == last_warped_pos create a composite slice;
Create composite of Original_Buffer[13] and Original_Buffer[12];
Put composite slice in Warped_Buffer[11]
orig_position is incremented to 14.

C. Addition of a Slice

Figure 4:
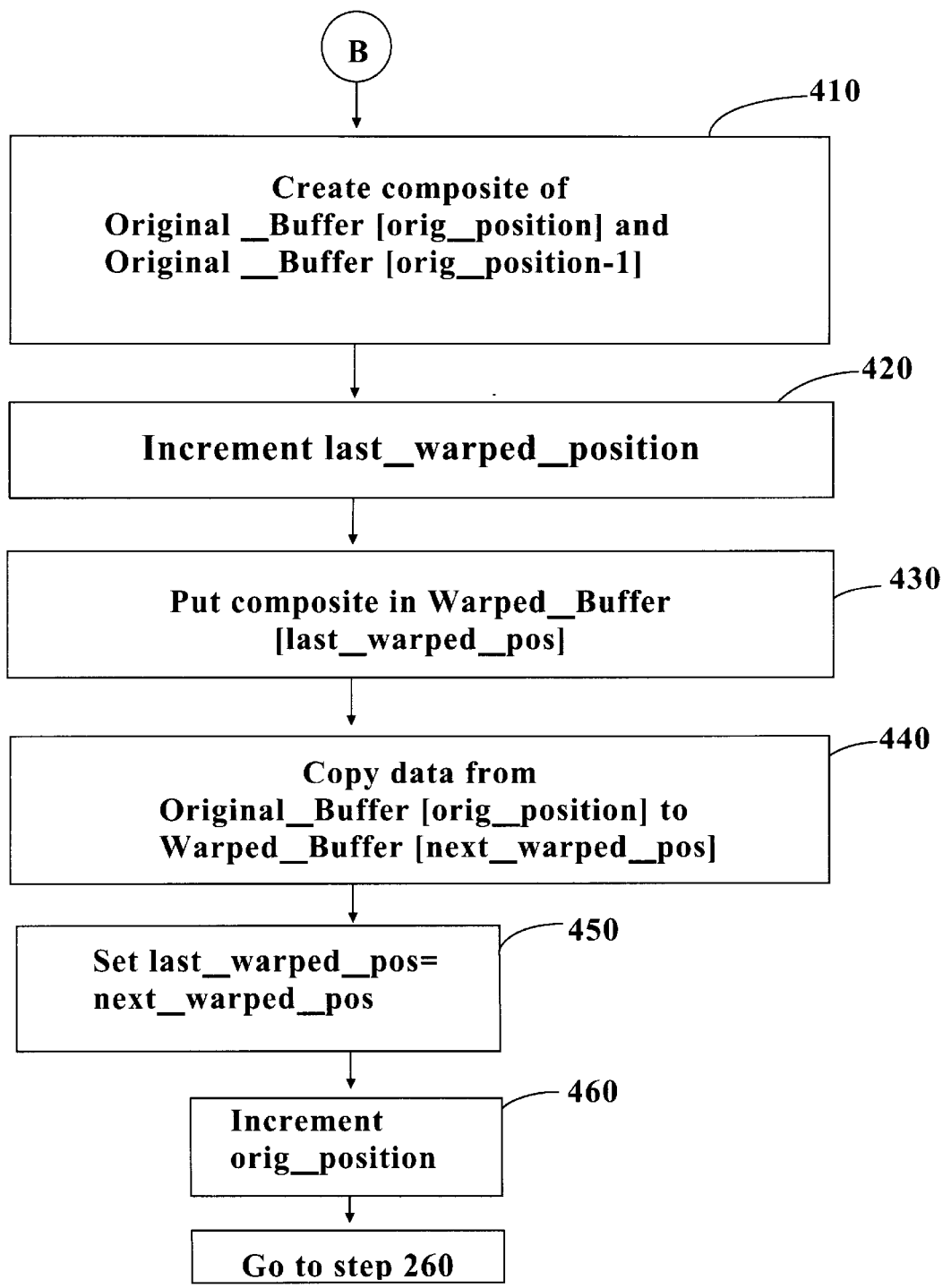
FIG. 4 is a flowchart generally depicting the algorithm for adding a linear grouping of pixels (e.g., a slice).

If the result of step 310 is "No", then the process continues as depicted in FIG. 4, at step 410, wherein next_warped_pos is more than one position greater than last_warped_pos. Accordingly, there are two vertical slices in Original Slice Image Data buffer that are separated by one pel position in the Warped Slice Image Data buffer. A composite slice is added to minimize artifacts. The composite slice is created at step 410. At step 420, last_warped_pos is incremented and the composite slice is placed in Warped_Buffer[last_warped_pos] at step 430. In step 440, the data from Original_Buffer[orig_position] is copied to Warped_Buffer[next_warped_pos]. At step 450, last_warped_pos is set to next_warped_pos and orig_position is incremented at step 460. Thereafter, the process continue at step 260 of FIG. 2.

| Step | Pseudo-code |
|---|---|
| [410] | create composite slice of<br>Original Buffer[orig_position] and<br>Original Buffer [orig_position − 1]; |
| [420] | last_warped_pos++; |
| [430] | put composite slice in Warped Buffer[last_warped_pos]; |
| [440] | copy data from<br>Original_Buffer[orig_position] to<br>Warped_Buffer[next_warped_pos]; |
| [450] | last_warped_pos = next_warped_pos; |
| [460] | orig_position++; |

This scenario occurs in Table 4, below, entitled: Image Warping Example Showing the Addition of Slices. Table 4 is the same format as Table 3.

TABLE 4

Image Warping Example Showing the Addition of Slices

| Horizontal Pel Location | Error Table Entry | Original Slice Image Data | | Warped Slice Image Data | | Warped Data Comment |
|---|---|---|---|---|---|---|
| | | Byte 0 | Byte 1 | Byte 0 | Byte 1 | |
| 0 | 0 | 00000000 | 00000000 | 00000000 | 00000000 | Original Data 0 |
| 1 | 0 | 00000000 | 00000000 | 00000000 | 00000000 | Original Data 1 |
| 2 | 1 | 11111111 | 11111111 | 01010101 | 10101010 | Composite 1 & 2 |
| 3 | 1 | 00000000 | 00000011 | 11111111 | 11111111 | Original Data 2 |
| 4 | 1 | 00000000 | 00000100 | 00000000 | 00000011 | Original Data 3 |
| 5 | | | | 00000000 | 00000100 | Original Data 4 |

Iteration 2 orig_position is 2;
last_warped_pos is 1;
next_warped_pos = 2 + error[2]; /* next_warped_pos is 3 */
Since next_warped_pos > last_warped_pos + 1 create composite slice;
Create composite of Original_Buffer[2] and Original_Buffer[1];
last_warped_pos++; /* last_warped_pos is set to 2 */
Place the composite slice in Warped_Buffer[2];
Data from Original_Buffer[2] is copied to Warped_Buffer[3];
last_warped_pos = next_warped_pos; /* last_warped_pos gets 3 */
orig_position is incremented to 3.

Iteration 3 orig_position is 3;
last_warped_pos is 3;
next_warped_pos = 3 + error[3]; /* next_warped_pos is 4 */
Since next_warped_pos == last_warped_pos + 1 no composite slice;
Data from Original_Buffer[3] is copied to Warped_Buffer[4];
last_warped_pos = next_warped_pos; /* last_warped_pos gets 4 */
orig_position is incremented to 4.

The same algorithms apply for warping the color image in the vertical dimension.

Use of Invention for Distortions in Either Print Image

While the invention has been described for masking the distortion of the first print image, the invention may be used to mask distortion of one or both print images. There are several scenarios:

A. Scenario 1:

Scenario 1 is the one described in the detailed description where a test print image is made of Process One 16. The print image of Process One 16 is printed without warping. An error table is created of the distortion of the test print image as compared to a perfect print process. The image produced by the second print process of Process Two 18 is then warped based on the measured distortion using the algorithms described.

B. Scenario 2:

In Scenario 2 a test image is made using Process One 16, and the first print image using print Process One 16 is printed without any warping. A test image of the second print process is printed using Process Two 18. An error table is created of the distortion between the test print images of Process One 16 as compared to the test print image of Process Two 18. The image printed by Process Two 18 is then warped based on the measured distortion.

C. Scenario 3:

Scenario 3 warps the first print image to make it "perfect" and then warps the second print image based on the "perfect" image of the first print process. This is accomplished as follows. A test print image using Process One 16 is printed. An error table is created of the distortion of the test print image as compared to a perfect print image. Both a test print image and the actual image to be printed by Process One 16 are warped based on the measured distortion. A test print image using Process Two 18 is printed. Other error tables are created of the distortion of the test print image of Process Two 18 as compared to the warped test image of Process One 16. The image to be printed by Process Two 18 is then warped based on the second measured distortion.

The previous scenarios are given as examples of how the invention may be used. Note that the error tables do not always have to be created to align print images perfectly. Instead, the measured distortions used to create the error tables may be measured so as to introduce distortion. Error tables for the second print image may then be created by measuring the distortion of the second print image as compared to the warped first print image.

While the invention has been described in detail with specific reference to preferred embodiments thereof, those skilled in the art will recognize that variations and modifications thereof may be made without departing from the spirit and scope of the following claims.

What is claimed is:

1. A method of aligning a print image to a desired position, the print image comprising a set of original linear groupings of pixels wherein a printer produces the print image, comprising the steps of:
   a) determining a distortion of the print image compared to the desired position;
   b) based on the determined distortion, identifying a set of original linear groupings of pixels to warp;
   c) generating a set of warped linear groupings of pixels corresponding to said set of original linear groupings of pixels;
   d) identifying a placement location in the print image for said warped linear groupings of pixels generated; and e) printing said print image with said set of warped linear groupings of pixels.

2. The method of claim 1, wherein said set of warped linear groupings of pixels comprises at least one composite linear grouping of pixels.

3. A method of aligning a second print image, comprising a plurality of linear groupings of pixels, with a first print image, comprising a corresponding plurality of linear groupings of pixels, wherein a first printer produces the first print image and a second printer produces the second print image, comprising the steps of:

a) determining a distortion of the first print image;

b) based on the determined distortion, identifying a set of linear groupings of pixels from the second print image to warp;

c) generating a warped linear grouping of pixels for each linear grouping of pixels of the set of linear groupings of pixels;

d) identifying a placement location in the second print image for each warped linear grouping of pixels generated; and e) printing the second print image with said each warped linear grouping of pixels being in alignment with each corresponding linear grouping of pixels of said first print image.

4. The method of claim 3, wherein said set of warped linear groupings of pixels comprises at least one composite linear grouping of pixels.

5. An image forming apparatus comprising:

a) a first printer for printing a first print image on a page;

b) a second printer for printing a second print image on a page; and c) an image processor for masking a distortion of the first print image including:

i) means for determining a distortion of the first print image;

ii) means for identifying a set of original linear groupings of pixels of the second print image to warp based on the distortion of the first print image;

iii) means for generating a warped linear grouping of pixels which corresponds to each original linear grouping of pixels of the set of original linear groupings of pixels;

iv) means for identifying a placement location for said each warped linear grouping of pixels generated; and v) means for placing said each warped linear grouping of pixels at its respective location.

6. The apparatus of claim 5, wherein the first printer is a laser printer.

7. The apparatus of claim 6, wherein the second printer is an ink jet printer.

8. The apparatus of claim 5, wherein the means for identifying includes a processor which generates an error table.

9. The apparatus of claim 5, wherein the set of original linear groupings of pixels includes consecutive slice n and slice n+1, and the means for generating a warped linear grouping of pixels includes a processor for generating a composite grouping of pixels that performs a logical OR between slice n and slice n+1.

10. The apparatus of claim 5, wherein the set of original linear groupings of pixels includes consecutive slice n and slice n+1, and the means for generating a warped linear grouping of pixels includes a processor for generating a composite grouping of pixels that performs a logical AND between slice n and slice n+1.

11. The apparatus of claim 5, wherein the set of original linear groupings of pixels includes consecutive slice n and slice n+1, and the means for generating a warped linear grouping of pixels includes a processor for generating a composite grouping of pixels that:

a) performs a logical AND between slice n and a binary series;

b) performs a logical AND between slice n+1 and a compliment of said binary series; and c) performs a logical OR between the results of steps (a) and (b).

12. The apparatus of claim 5, wherein the set of original linear groupings of pixels includes consecutive slice n and slice n+1, and the means for generating a warped linear grouping of pixels includes a processor for generating a composite grouping of pixels that:

a) performs a logical AND between slice n and a HEX 55AA repeating binary series;

b) performs a logical AND between slice n+1 and a HEX AA55 repeating binary series; and c) performs a logical OR between the results of steps (a) and (b).

13. The apparatus of claim 5, wherein the set of original linear groupings of pixels includes consecutive scan line n and scan line n+1, and the means for generating a warped linear grouping of pixels includes a processor for generating a composite grouping of pixels that performs a logical OR between scan line n and scan line n+1.

14. The apparatus of claim 5, wherein the set of original linear groupings of pixels includes consecutive scan line n and scan line n+1, and the means for generating a warped linear grouping of pixels includes a processor for generating a composite grouping of pixels that performs a logical AND between scan line n and scan line n+1.

15. The apparatus of claim 5, wherein the set of original linear groupings of pixels includes consecutive scan line n and scan line n+1, and the means for generating a warped linear grouping of pixels includes a processor for generating a composite grouping of pixels that:

a) performs a logical AND between scan line n and a binary series;

b) performs a logical AND between scan line n+1 and a compliment of said binary series; and c) performs a logical OR between the results of steps (a) and (b).

16. The apparatus of claim 5, wherein the set of original linear groupings of pixels includes consecutive scan line n and scan line n+1, and the means for generating a warped linear grouping of pixels includes a processor for generating a composite grouping of pixels that:

a) performs a logical AND between scan line n and a HEX 55AA repeating binary series;

b) performs a logical AND between scan line n+1 and a HEX AA55 repeating binary series; and c) performs a logical OR between the results of steps (a) and (b).

17. The apparatus of claim 5, wherein each said linear grouping of pixels is a slice of pels.

18. The apparatus of claim S, wherein each said linear grouping of pixels is a scan line of pels.

* * * * *